US007442125B2

(12) United States Patent
Paulsen et al.

(10) Patent No.: US 7,442,125 B2

(45) Date of Patent: Oct. 28, 2008

(54) PROGRAMMABLE COMPUTER CONTROLLED EXTERNAL VISUAL CANDLE AND BEZEL INDICATORS FOR A GAMING MACHINE

(75) Inventors: Craig A. Paulsen, Reno, NV (US); Paul M. Crozier, Reno, NV (US); Lisa G. Harkins, Reno, NV (US)

(73) Assignee: IGT, Reno, NV (US)

( * ) Notice: Subject to any disclaimer, the term of this patent is extended or adjusted under 35 U.S.C. 154(b) by 247 days.

(21) Appl. No.: 10/435,298

(22) Filed: May 9, 2003

(65) Prior Publication Data

US 2004/0053663 A1 Mar. 18, 2004

Related U.S. Application Data

(63) Continuation-in-part of application No. 10/008,748, filed on Dec. 6, 2001.

(51) Int. Cl.
*A63F 13/00* (2006.01)

(52) U.S. Cl. ........................................................ 463/30

(58) Field of Classification Search ............. 463/30-37, 463/20; 40/452, 453; 362/800
See application file for complete search history.

(56) References Cited

U.S. PATENT DOCUMENTS

| | | | | |
|---|---|---|---|---|
| 3,987,401 | A | | 10/1976 | Irving |
| 4,211,955 | A | | 7/1980 | Ray |
| 4,389,609 | A | * | 6/1983 | Kawamura ............. 340/636.12 |
| 4,457,580 | A | * | 7/1984 | Klose ......................... 359/221 |
| 4,682,147 | A | | 7/1987 | Bowman |
| 5,187,377 | A | | 2/1993 | Katoh |
| 5,224,958 | A | * | 7/1993 | Warunek et al. ......... 433/168.1 |
| 5,257,020 | A | | 10/1993 | Morse |
| 5,406,300 | A | * | 4/1995 | Tokimoto et al. ............. 345/31 |
| 5,521,587 | A | | 5/1996 | Sawabe et al. |
| 5,561,346 | A | | 10/1996 | Byrne |
| 5,575,459 | A | | 11/1996 | Anderson |
| 5,605,506 | A | * | 2/1997 | Hoorn et al. .................. 463/42 |
| 5,670,971 | A | | 9/1997 | Tokimoto et al. |
| 5,748,157 | A | * | 5/1998 | Eason ......................... 345/31 |
| 5,836,819 | A | * | 11/1998 | Ugawa ........................ 463/30 |
| 5,850,126 | A | | 12/1998 | Kanbar |
| 5,936,599 | A | | 8/1999 | Reymond |
| 6,239,716 | B1 | | 5/2001 | Pross et al. |
| 6,241,362 | B1 | | 6/2001 | Morrison |

(Continued)

OTHER PUBLICATIONS

Office Action from U.S. Appl. No. 10/008,748, mailed Feb. 13, 2003, 8 pages.

(Continued)

*Primary Examiner*—John M Hotaling, II
*Assistant Examiner*—Damon Pierce
(74) *Attorney, Agent, or Firm*—Weaver Austin Villeneuve & Sampson LLP

(57) ABSTRACT

An improved external visual indicator, such as a candle or a visual display panel provided for a gaming machine having lights such as LEDs which are programmable via a processor of the gaming machine. The reprogrammability of the illumination sequence and colors of the candle or visual display panel may provide for the promotion of bonusing and to aid in the servicing of gaming machines. Any assortment of colors of LEDs and combinations thereof may be provided and programmed via the processor of the gaming machine.

52 Claims, 6 Drawing Sheets

U.S. PATENT DOCUMENTS

| | | | | |
|---|---|---|---|---|
| 6,244,958 | B1 | 6/2001 | Acres | |
| 6,265,984 | B1 * | 7/2001 | Molinaroli | 340/815.4 |
| 6,278,419 | B1 * | 8/2001 | Malkin | 345/31 |
| 6,302,790 | B1 * | 10/2001 | Brossard | 463/20 |
| 6,305,821 | B1 | 10/2001 | Hsieh et al. | |
| 6,371,636 | B1 | 4/2002 | Wesson | |
| 6,897,624 | B2 * | 5/2005 | Lys et al. | 315/297 |
| 7,014,563 | B2 * | 3/2006 | Stephan et al. | |
| 2003/0027631 | A1 | 2/2003 | Hedrick et al. | |
| 2003/0054881 | A1 | 3/2003 | Hedrick et al. | |
| 2003/0064814 | A1 | 4/2003 | Stephan et al. | |
| 2005/0111217 | A1 * | 5/2005 | Feng | |
| 2007/0020572 | A1 * | 1/2007 | Furner et al. | |

OTHER PUBLICATIONS

Final Office Action from U.S. Appl. No. 10/008,748, mailed May 29, 2003, 9 pages.

Office Action from U.S. Appl. No. 10/008,748, mailed Aug. 18, 2003, 9 pages.

Final Office Action from U.S. Appl. No. 10/008,748, mailed Apr. 1, 2004, 10 pages.

Office Action from U.S. Appl. No. 10/008,748, mailed Aug. 3, 2003, 8 pages.

Final Office Action from U.S. Appl. No. 10/008,748, mailed Jun. 8, 2005, 6 pages.

Office Action from U.S. Appl. No. 10/008,748, mailed Dec. 7, 2005, 5 pages.

Final Office Action from U.S. Appl. No. 10/008,748, mailed Jul. 10, 2007, 7 pages.

Office Action from Australian Application No. 2002346635, dated Nov. 16, 2007, 2 pages.

International Search Report from International Patent Application No. PCT/US02/38663, mailed Feb. 26, 2003, 2 pages.

Office Action in corresponding U.S. Appl. No. 10/008,748, dated Aug. 18, 2003; Office Action in corresponding U.S. Appl. No. 10/008,748, dated Jun. 8, 2005; and Office Action in corresponding U.S. Appl. No. 10/008,748, dated Dec. 7, 2005 (Total 23 pages).

Second AU Office Action mailed Feb. 22, 2008 from Australian Patent Application No. 2002346635, received Mar. 26, 2008. 2 pp. (IGT1P339AU).*

Supplemental Notice of Allowance and Notice of Allowability from U.S. Appl. No. 10/008,748, mailed Mar. 17, 2008 (IGT1P339).*

* cited by examiner

PROGRAMMABLE COMPUTER CONTROLLED EXTERNAL VISUAL CANDLE AND BEZEL INDICATORS FOR A GAMING MACHINE

The present application is a continuation-in-part of Ser. No. 10/008,748 filed Dec. 6, 2001.

BACKGROUND

The present invention relates generally to gaming machines and in particular to external visual indicators for such gaming machines. In a particular embodiment the invention pertains to the programming of tower lamps, candles or display panel mounted to a gaming machine.

Gaming machines, such as slot machines, generally have an external visual indicator such as a multi-colored electronic light, tower lamp or "candle" provided thereon. Such candles provide a visual indicator that may be viewed from many yards away from the machine that identify certain occurrences or servicing needs of that particular gaming machine. For example, the need to fill a coin hopper in a gaming machine may be indicated with a yellow light that indicates that additional quarters are needed. A red light in certain circumstances may indicate that a jack-pot has been won. Other colors may be indicative of the need for servicing of the machine. Generally, gaming machines have candles having one to four stages that are colored either red, yellow, blue or green. Such candles generally have an incandescent light bulb surrounded by a clear or translucent cylindrical shell. Inserted within the shell is generally a colored mylar insert or colored plastic film. Each stage of the candle has a different colored film in order to provide the transmission of each particular color at each stage. Such arrangements have the disadvantage in that if the colors of the candle ever need to be changed it may be a difficult and time consuming operation. Generally, a casino service technician will have to climb to the top of the gaming machine, dismantle the candle, remove any of the colored films within the candle that are undesirable and insert new colored films at the desired stages of the candle. Such changes of the colors of machines may be frequent. For example, if a machine is changed from a quarter machine to a dollar machine it is necessary to change the colors of the candle.

Further, the presently known candles that are not programmable require that each type of gaming machine have a custom manufactured candle. Each machine may have a different orientation of stages and colors of the candle that must be individually manufactured and assembled. Therefore that manufacturer cannot keep in stock hundreds of uniform candles to be used on any machine which increases production costs and may cause delays in production of the entire gaming machine. The present invention introduces a programmable candle that could reduce manufacturing costs since one candle could be manufactured that may be programmed by the end purchaser of the gaming machine to suit the desired purpose.

In addition, a prior art system of candles having colored film inserts has very limited uses for providing other information. It is desirable to have a visual indication means on a gaming machine that can provide a multitude of information and be altered quickly and easily. A prior art system provides for a maximum of four colors in a static orientation. The ability to reprogram the colors of the lights and their orientation or sequence of transmission or flashing would provide a visual indicator that would multiply by thousands the potential signals or information that a gaming machine may transmit visually. By having multiple lighting effects and sequences, casinos using such gaming machines could use the candles in many new and different ways to create marketing and promotional opportunities and create more excitement in the area where such gaming machine(s) are located. It should be recognized that the visual indicator of the present invention may be used with any conventional gaming machine. Exemplary manufacturers of such gaming machines include IGT, of Reno, Nev. and Bally Gaming, Inc. of Las Vegas, Nev. Candles provided on gaming machines of such vendors typically include two light sources, although some candles may have 1, 3, or 4 light sources. Each such light source is located in a different vertical position and has a different associated color band. This allows the gaming machine to display messages coded by different colors. Therefore, there is desired a gaming machine having a programmable computer operated visual indicator. The present invention provides such a device.

SUMMARY OF THE INVENTION

In accordance with one embodiment of the present invention, a gaming machine comprises a user input panel, a processor connected to the input panel and adapted to be programmed in response to an input operation by a user, an external visual indicator mounted to the gaming machine and providing illumination of at least two colors and a processor providing for the control of the color display of the external visual indicator.

In an illustrative embodiment, the gaming machine may also comprise the external visual indicator having a cylindrically-shaped electronic candle mounted on a top surface of the gaming machine or a bezel located at a player tracking television panel. The gaming machine comprises the external visual indicator including multiple LEDs connected to the processor. The gaming machine may further comprise a pulse width modulator (PWM) connected to the processor and a current driver connected to the PWM and connected to the LEDs. The gaming machine may further comprise an external visual indicator having at least two stages and each stage having at least three LEDs mounted therein. The gaming machine may further comprise the processor providing for the ability to provide a strobing effect of the LEDs. The gaming machine may further comprise the LEDs providing for the colors red, green, blue, orange, yellow, and/or white. The gaming machine may further comprise the processor having the ability to produce colors other than the primary colors by mixing the colors of the LEDs. The gaming machine may further comprise LEDs that are comprised of three colors: red, green and blue in one package. Such LED's can emit any color. The gaming machine may further comprise an I/O (input/output) interface connected to the processor. The gaming machine may further comprise a coding and buffer system connected to the I/O interface. The gaming machine may further comprise a DC power supply connected to the current driver. The gaming machine wherein a user may access a user input panel and choose a combination of lights and colors to be displayed so that an electrical signal is sent to the processor which signals the I/O interface, which signals the coding and buffer system which signals the PWM in order to control the current driver, in order to simultaneously control the LEDs of the candle and the bezel according to the combination chosen by the user. The gaming machine wherein the processor may include all other components and functions in order to operate the gaming machine and provides for the main processor. The gaming machine wherein the PWM may be connected to the main processor via a secondary stand-alone board. In another illustrative embodiment, the processor may be a secondary processor which is separate from the main processor that operates the primary functions of the gaming machine.

In one embodiment of the present invention, a method is provided for promoting the use of gaming machines via the use of computer-programmed external visual indicators, the method comprising the steps of providing a gaming machine having a programmable external visual indicator connected to a processor of the gaming machine, coordinating the external visual indicator and a display panel with a first special event of the gaming machine, programming the processor so that a first customized illumination pattern is provided by the external visual indicator and the display panel in order to designate the first special event and automatically triggering the first customized illumination pattern of the external visual indicator and the display panel upon the occurrence of the first special event. The method may further comprise the external visual indicator being a cylindrically-shaped or other shape electronic candle and the display panel includes a colored bezel. The method may further comprise the first special event being a bonus round. The method may further comprise the first special event being a jackpot. The method may further comprise the first special event being a requirement to service the gaming machine. The method wherein the first customized illumination pattern may include a strobing effect. The method wherein the first customized illumination pattern may include a combination of lights to provide a yellow illumination. The method wherein the first customized illumination pattern may include the combination of lights to provide a purple illumination. The method wherein the first customized illumination pattern may include a combination of lights to provide a green illumination. The method wherein the first customized illumination pattern may include a combination of lights to provide an orange illumination. The method wherein the first customized illumination pattern may include a combination of lights to provide an indigo illumination. The method wherein the first customized illumination pattern may include a combination of lights to provide a violet illumination. The method wherein the first customized illumination may include a combination of lights to provide a first stage of a candle having a first color and a second stage of the candle having a second color. The method wherein the first customized illumination pattern may include a combination of lights to provide a first stage of a candle having a first color, a second stage of the candle having a second color and a third stage of the candle having a third color. The method wherein the first customized illumination pattern may include a combination of lights to provide a first stage of a candle having a first color, a second stage of the candle having a second color, a third stage of the candle having a third color and a fourth stage of the candle having a fourth color.

In an embodiment the method may further comprise the steps of programming the processors so that a second customized illumination pattern is provided. The method may further comprise the steps of programming the processor so that a second special event triggers the second customized illumination pattern. The method wherein the programmable external visual indicator may comprise multiple LEDs mounted within a cylindrically-shaped or other shape electronic candle or a bezel of the display panel. The method wherein the programmable external visual indicator may comprise a cylindrically-shaped electronic candle or bezel having at least two stages and each stage having LEDs mounted therein consisting of a group of LED's containing individual red, green or blue LED's.

In one embodiment, the method wherein the step of programming the processor may further include the steps of providing a user input panel, choosing the combination of lights and colors to be displayed, sending an electrical signal to the processor, signaling an I/O interface, signaling the coding and buffering system, signaling a pulse width modulator in order to control a current driver in order to control the LEDs according to the combination chosen by the user. The method wherein the steps of automatically triggering the first customized illumination pattern may occur via sending an electrical signal to the processor, signaling an I/O interface, signaling a coding and buffer system, signaling a pulse width modulator in order to control the current driver, in order to control the LEDs according to the combination chosen by the user.

Another embodiment of the present invention may provide for an improved cylindrical or other shape electronic candle or display panel mounted on a gaming machine comprising a gaming machine having a signal processor connected to a pulse width modulator, connected to a current driver that is connected to multiple LEDs mounted in the candle or the display panel, a user input panel provided by the gaming machine connected to the processor by which a first illumination pattern may be selected and by which the user may indicate a first special event that will trigger the first illumination pattern. The gaming machine wherein the set-up menu provides for a second illumination pattern and a second special event. The gaming machine wherein the candle or bezel includes three stages having multiple LEDs per stage. The gaming machine wherein the candle or bezel is controlled via a network or computer system that controls the candle in a bonusing or a progressive jackpot situations. The gaming machine wherein the candle or bezel includes a conical parabolic reflector mounted to a printed circuit board having LEDs mounted thereon that reflect light off of said reflector and out of the candle. The gaming machine wherein the candle or bezel includes multiple translucent rods mounted within the candle corresponding to LEDs mounted therein in order to illuminate the rods. The gaming machine wherein the candle or bezel includes translucent disks mounted within the candle adjacent to corresponding LEDs in order to illuminate the disks. The gaming machine wherein the display panel is a colored bezel.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE PRESENTLY PREFERRED EMBODIMENTS

Figure 1:
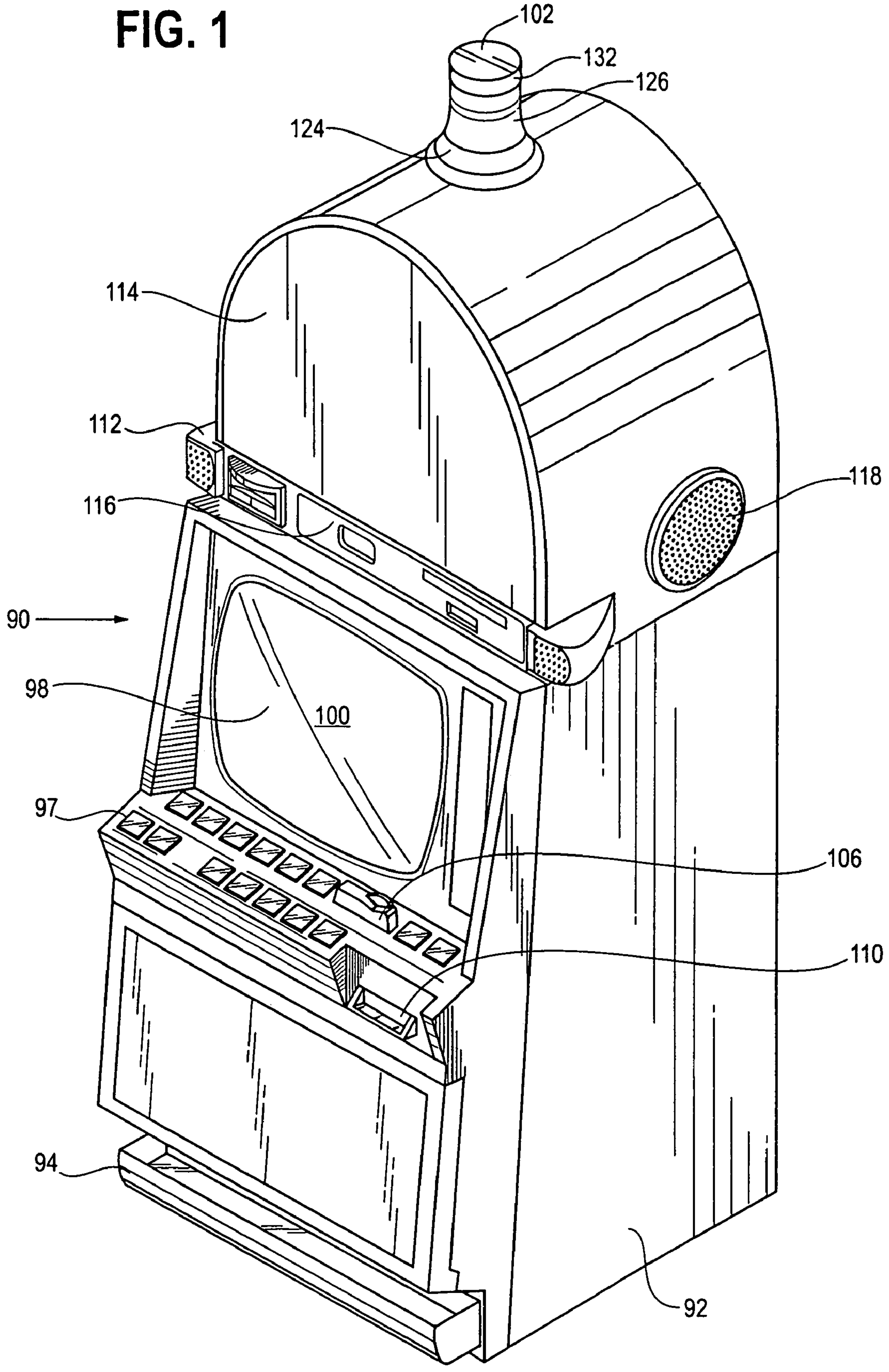
FIG. 1 is a perspective view of a standard gaming machine having the external visual indicator of the present invention mounted thereon.

Embodiments of the present invention are described in view of FIGS. 1-8 wherein like numerals designate like elements in the FIGURES. In FIG. 1 a first embodiment of a gaming machine 90 is shown and includes a machine chassis 92, various game play option buttons 97, touch pad or user input panel 98, and a video monitor display 100. It is important to note the external visual indicator or candle 102 is located on top of the gaming machine chassis 92 in the same location and orientation as a conventional candle. Further, the candle may have the same external appearance as a cylindrically-shaped or other shaped conventional candle. However, unlike a conventional candle, the candle 102 includes an a light emitting means that may be quickly and easily reprogrammed. Although a candle 102 is shown that has one stage, the present invention may operate with a candle having any number of stages from 1 to 10. In addition, in other embodiments the candle may be square, pyramidal or any other shape. In an embodiment the gaming machine includes dollar bill acceptor 110, speaker assembly 112, illuminated panel 114, player tracking panel 116 and speaker 119.

To play the gaming machine 90, a player inserts coins or tokens through a slot 106, activates the machine by in some cases pushing buttons 97 or touching on the panel 98, or taking some other action. The player then observes the indicators on display 100 to determine if he or she has obtained a winning combination. If so, the display 100 may indicate the amount won. Simultaneously, any winnings will be dropped into a tray 94. At various stages during this procedure, the candle 102 may be active. For example, if a player does win, a coin hopper in the gaming machine 90 may have to be refilled. In this case, a candle light of a particular color will be illuminated. This is an example of a traditional use of a candle 102, which use continues to be programmable via the present invention. The candle 120 includes a base 124 adapted to be mounted on the gaming machine chassis 92. The base 124 is also adapted to receive a cylindrical sleeve 126. In prior art devices this cylindrical sleeve would have been tinted or treated with a film in order to transmit light of a particular color from a first light source disposed within a lower region of candle such as an incandescent bulb. In the present invention the sleeve 126 may be translucent or transparent. A divider ring may separate a lower cylindrical sleeve, or first stage, from an upper cylindrical sleeve or second stage. A cap 132 is provided on top of upper most cylindrical sleeve 126. The cap may be held in place on top of candle by a nut or other fastener which is screwed onto a threaded vertical rod (not shown) which spans the interior of candle 120. Located inside the candle, spaced as desired, are a light source or multiple light sources. In an embodiment, LEDs may be used to provide illumination. However, other light sources that emit colored light such as colored incandescent bulbs, neon lights, etc. may be used. In an embodiment the LEDs may be oriented at each stage where at least one LED of each desired color is located at each stage, as will be described in more detail below with regard to FIG. 3. Single LEDs that emit multiple colors may be used as well.

Figure 2:
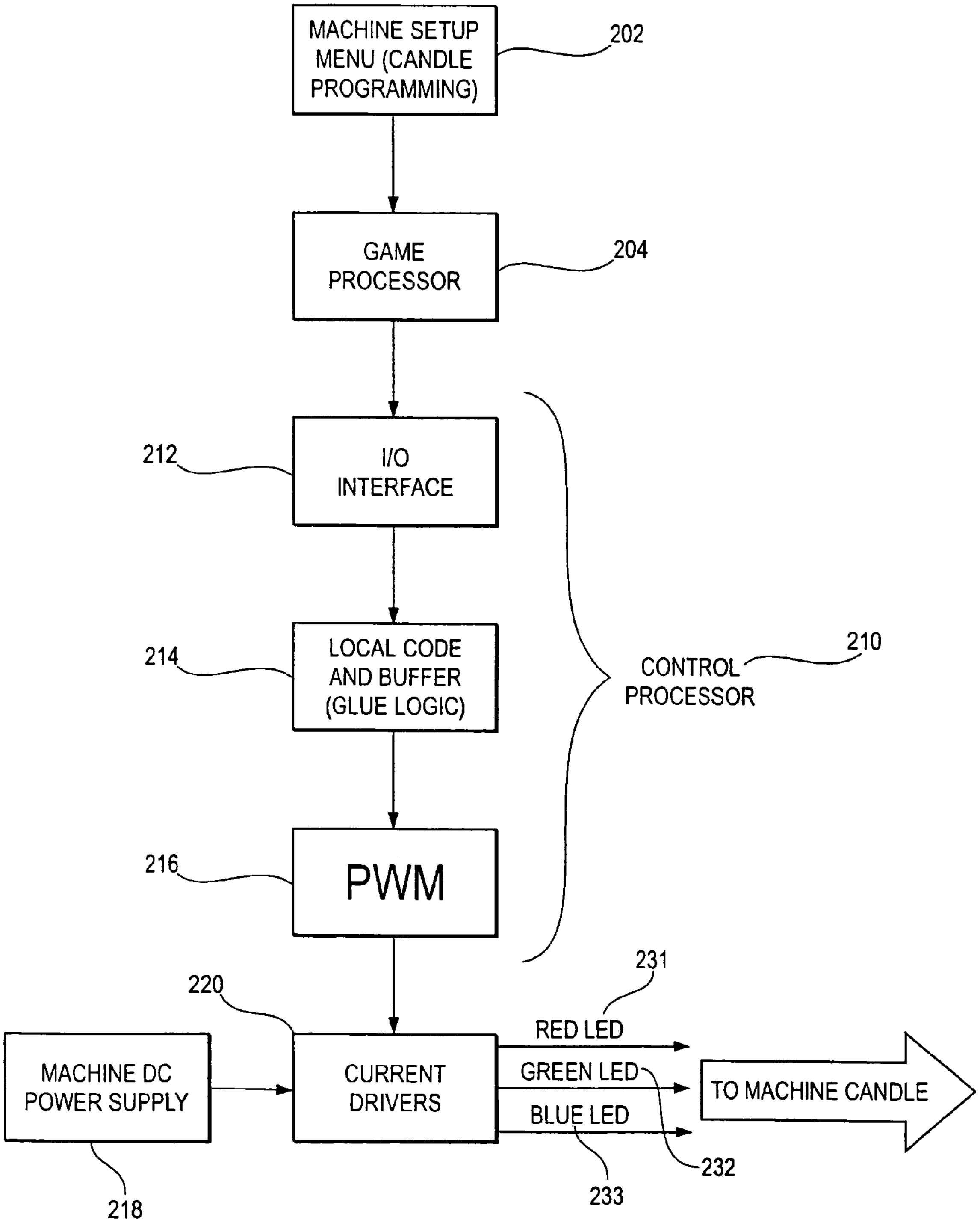
FIG. 2 is a flow diagram of the operation of the present invention.

FIG. 2 discloses a flow diagram indicating the preferred operation of the present invention. A machine set-up menu 202 is provided which allows for the programming of the candle 102. The set-up menu 202 is accessible through the touchpad screen or user input panel 98 on the monitor 100 of the gaming machine 92. For example, if the access to the candle set-up menu is to be accessed only by personnel of the gaming facility, or casino, a security code may be required to be input through the touch screen 98 in order to access such a setup mode. Existing player or user, interface switches 97 on the games front panel may be assigned temporary special functions during a special "setup mode" where illumination patterns may be selected or programmed by the user. In the case of video games, these controls may be in the form of buttons on a "touchscreen" 98. A window or set-up menu may appear on the panel or through touchscreen 98 on the monitor 100 or toggling player switches 97 and viewing results in an external display displaying certain options available in order to set-up and program the candle 102. Certain headings could be provided on the panel display 98 such as Colors, Illumination Intensity, Orientation, Strobing Effect, Coordination with Special Events, etc. Upon touching one of the headings on the panel 98 a scroll-down menu may appear giving further choices in order to program the candle. This touch-pad or panel 98 can also be used to program the other main functions or operation of the gaming machine, as is known to one of ordinary skill in the art. The touch screen and the graphics displayed on the user input panel 98, including the set-up menu, are controlled by software which is controlled by the game processor 204. In a preferred embodiment, the game processor which controls all the functions of the gaming machine also controls the candle and the programming thereof. An alternate embodiment is discussed below where a separate processor may be provided in order to provide solely for the programming of the candle.

The game processor 204 is connected to a control processor 210. The control processor in an embodiment comprises of an I/O (input/output) interface 212 connected to local coding and buffer (Glue Logic) 214 which is connected to a pulse width modulator (PWM) 216. In an embodiment, instead of the use of a PWM, a digital-to-analog converter may be used. These three elements comprise the Control Processor 210, which is electrically connected to a current driver 220. The current driver is connected to a DC power supply 218. In an embodiment a 25 volt power supply may be provided. This, in a preferred embodiment, is included in the power supply 218 that provides power for the entire gaming machine. However, in an alternate embodiment, a separate power supply may be provided solely for the current driver 220 for the candle 102. Running from the current driver are electrical wires that connect to the external visual indicator elements of the candle 102. In a preferred embodiment these external visual indicators will be LEDs. FIG. 2. shows the current driver connected to three LEDs. A first LED 231 which is red, a second LED 232 which is green and a third LED 233, which is blue. These LEDs 231, 232, 233 are mounted within the machine candle. However, the current driver may be connected to any number of LEDs from one to 1,000. The principal limitation of the number of LEDs is the current capacity of the current driver 220 and the power supply 218.

The programming of the candle may occur as follows:

A user opens the setup menu 202 via the user input panel 98 and indicates the color and sequence and combination of lighting that is desired. This information is received by the game processor 204, which stores that information. Along with the stored information is the triggering event such as a certain occurrence of the gaming machine or as directed by a networked system application. For example, a bonus round or a jackpot. Upon the occurrence of the triggering event, the game processor 204 will signal the I/O interface 212, which will then signal the local coding and buffer system 214 which will then provide an electronic signal to the pulse width modulator, which will then signal the current driver 220, which will then provide the electrical signal to the required number of LEDs in the proper sequence. In some embodiment, a USB protocol may be used in order to program the I/O interface 212. It is apparent that the present invention provides for the programming of the candle but also the reprogramming of the candle and replacement of one set of illumination selection instructions with another set of illumination selection instructions.

Figure 3:
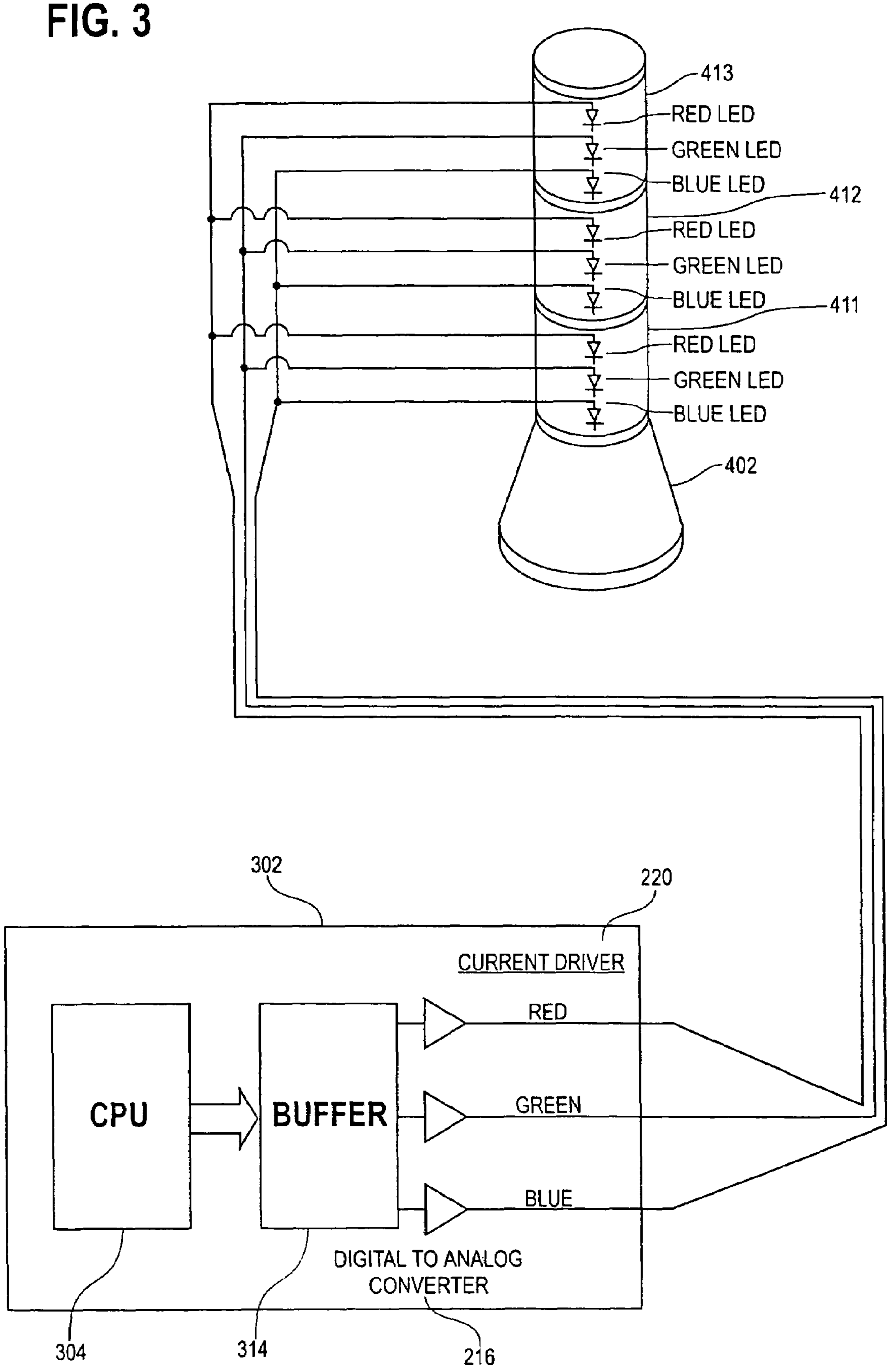
FIG. 3 is an alternate embodiment showing an electronic flow diagram and its diagrammatic connection to a external visual indicator.

Turning to FIG. 3. is an alternate embodiment of the present invention as shown. An add-on board 302 may be added to the existing processor board which was under the I/O interface control 212. This stand-alone board 302 functions separate or apart from the main circuit board of the gaming machine having a main processor such as processor 204 shown in FIG. 2. In certain circumstances, it may be preferable to have an add-on board 302 in order to upgrade a gaming machine which does not have a reprogrammable candle 102. In such an instance, it is more efficient to provide an add-on board 302 than to remove the main printed circuit board and processor in order to put an entirely new board in the gaming machine. The add-on board 302 includes its own central processor unit 304 which is connected to a buffer 314 which includes an interface and is connected to a digital-to-analog converter 216. In an embodiment, instead of a digital analog converter 218, a PWM may be provided. These are then connected through a current driver 220 which is then connected to the external visual indicators.

In the embodiments shown in FIG. 3, LEDs are used as the external visual indicators. In the embodiment shown, LEDs with arrays of red, green, blue are disclosed. However, as discussed previously, additional quantities and types LEDs may be provided. In fact, the add-on board 302 is shown connected to candle 402 which includes a first stage 411, a second stage 412 and a third stage 413. The stages of the candle may be constructed similar to that described previously as the candle disclosed in FIG. 1. However, one additional stage 413 is provided. In this embodiment of the invention, 3 LEDs are shown displayed in each stage. (The diagram in FIG. 3 is merely diagrammatic in that the electrical connections going to each of the three stages is merely representative and the actual connections, as would be known to one of ordinary skill in the art, would be through electrical cables running through the bottom of the candle 402 up inside the cylindrical or other shape shell of the candle and connecting to printed circuit boards therein with the LEDs mounted thereon.) The diagrammatic illustration in FIG. 3 indicates that stage one 411 will have a red, green and blue LED or other types and configurations and likewise for stage two 412 and stage three 413. The orientation of the LEDs shown in FIG. 3 in the vertical arrangement is also only diagrammatic. The orientation of the actual LEDs within the candle 402 may be arranged according to the manufacturer's preference in order to provide for the best illumination effect. For example, all the LEDs at each stage may be mounted in one horizontal level or they may be placed adjacent the external circumference of the outer cylinder walls in order to provide a brighter illumination of the LEDs.

Based on the previous discussions of the programming of the candle via the processor. It should be understood that the LEDs may be lit in any orientation according to any sequence triggered by any special event of the gaming machine. For example, all of the green LEDs in stage one 411, two 412 and three 413 may be lit upon the occurrence of a bonus round. In a further round of the game, all of the blue LEDs in stage one 411, two 412 and three 413 may be lit to identify a second bonus round. Finally, if it is so desired, if a third bonus is reached all of the red LEDs in stage 1, 2 and 3 may be lit.

Further, the LEDs may be lit in order to provide other colors. The lighting of the blue and red LED in stage one 411 may provide for a purple color to be illuminated therein. This may be done simultaneously with the lighting of the blue and green LEDs in stage two 412 which may provide a yellow color to be illuminated. Finally, the red and blue LED in stage three 413 may be illuminated in order to provide an indigo colored illumination. In fact, by use of LED's with red, blue and green any color may be produced and a tri-color red, blue or green LED in one stage provides 360° of uniform color. Further, it may be understood that the LEDs may be turned on and off in rapid succession in order to provide certain special effects. For example, a strobing effect of the lights having certain colors may be provided. In another presentation of the lights, a visual effect of a ring of lights may be provided which moves up and down the candle 102 according to the programming of the processor by sequentially illuminating the LEDs. To provide such an effect, additional LEDs may be needed wherein multiple LEDs at each stage are required. In another embodiment, multi-colored LEDs may be provided in order to provide the maximum illumination effect.

Figure 4:
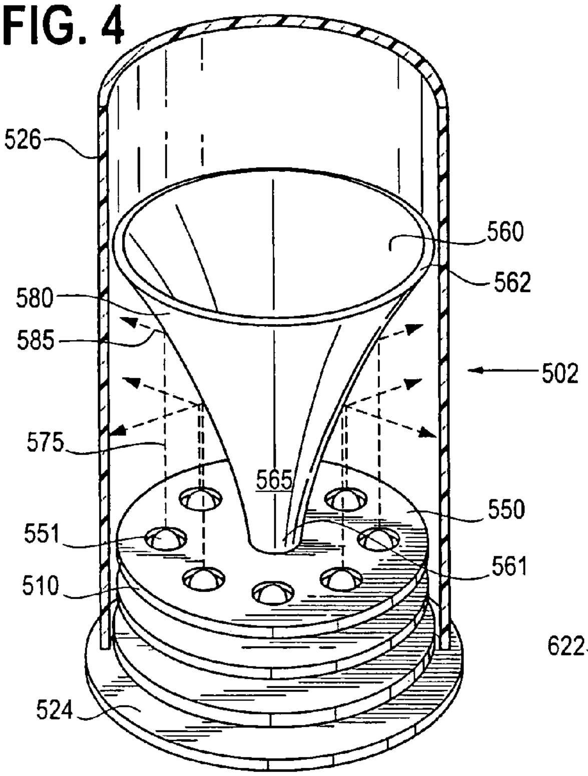
FIG. 4 is an embodiment of the internal construction of a candle of the present invention.
Figure 5:
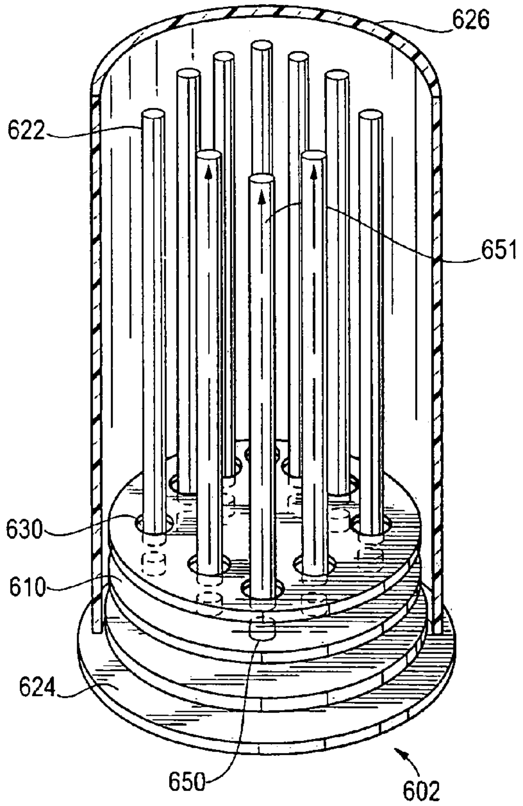
FIG. 5 is another embodiment of the internal construction of a candle of the present invention.
Figure 6:
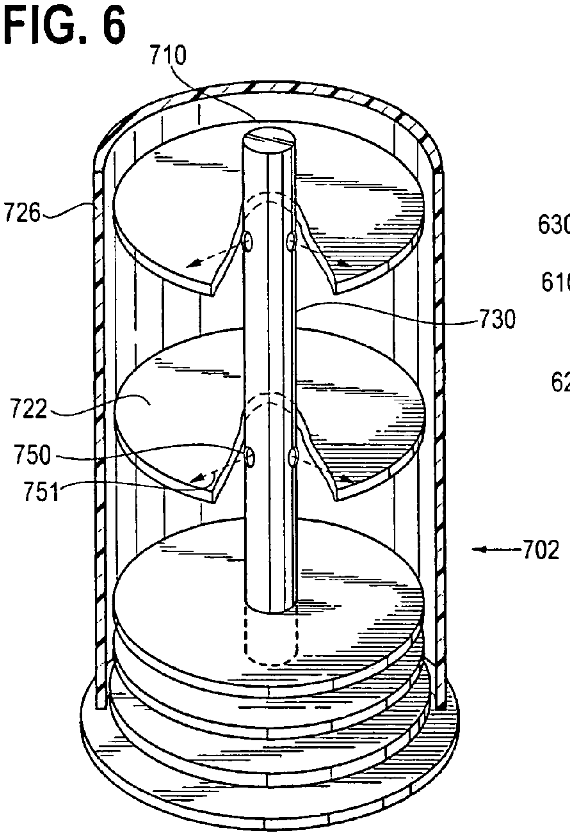
FIG. 6 is a further embodiment of the internal construction of a candle of the present invention.

FIGS. 4-6 disclose embodiments of the internal construction of a candle of the present invention. For example, FIG. 4 discloses candle 502 formed by candle sleeve or tube 526. The candle tube 526 in an embodiment may formed of clear plastic or glass. Located at the base 524 of the candle is a circular shaped printed circuit board (PCB) 510 having LEDs 550 mounted thereon. The LEDs 550 are oriented around the diameter of the PCB forming a circular pattern of LEDs 550. The LEDs may be of any color such as alternating red, green and blue. Mounted at the center of the PCB 510 and projected upwardly is a conical parabolic reflector 560. The conical parabolic reflector 560 has a highly polished or mirrored surface 565. The conical parabolic reflector 560 has a first end 561 mounted to the PCB 510 and a second end 562 adjacent a cap of the candle (not shown). The diameter of the conical parabolic reflector 560 increases from the first end 561 to the second end 562. The second end 562 has a diameter slightly less than the diameter of the candle tube 526.

As shown in FIG. 4 the light from the LEDs is transmitted upward and perpendicular to the plane of the PCB 510 and parallel to the sides of the candle tube 526. For example, the light from LED 551 follows the direction of arrow 575 until it hits the surface 565 of the conical parabolic reflector 560 at point 580. The mirrored surface 565 causes the light from the LED to reflected at an angle towards the sides of the candle tube 526 along the direction of arrow 585 and transmit through the translucent candle tube 526. The light from the LED 551 is reflected at approximately a 90 degree angle. The location of the LEDs 550 may be oriented in a predetermined location on the PCB 510 in order to effect the angle at which the light will be reflected. LEDs located closer to the center of the PCB 510 and the first end 561 of the conical parabolic reflector 560 will strike the curved surface of the conical parabolic reflector 560 sooner and at a smaller angle. LEDs mounted farther from the center of the PCB 510 will travel further before striking the conical parabolic reflector 560 and will be reflected closer to the second end 562 at a larger angle. The overall effect of multiple multi-colored LEDs being reflected by the conical parabolic reflector 560 will be a rainbow effect for the human eye observing the rays of light emitted from the candle 502. As discussed previously, the color of light and frequency at which the light rays are transmitted can be controlled by the computer in order to greatly vary the illumination pattern.

FIG. 5 discloses another embodiment of the internal construction of a candle 602 having a candle tube 626. Mounted at the base 624 of the candle 602 is a PCB 610 having a plurality of LEDs 650 mounted thereon. Mounted above the PCB 610 is a support plate 615. In a preferred embodiment the support plate 615 and the PCB 610 have an equal diameter that is approximately equal to the inside diameter of the candle tube 626. Mounted to the support plate in an embodiment are a plurality of clear or translucent or transparent acrylic rods 622 which protrude through holes 630 in the support plate 615 so that the ends of the rods 622 are exposed. The each rod 622 is oriented to a corresponding LED 650 on the PCB 610 so that the majority of the light transmitted from each LED 650 is received in the end of the corresponding rod 622 so that little coupling loss occurs. In an embodiment the end of each rod 622 that is adjacent the PCB 610 is polished to allow for the maximum transmission of light. Each rod therefore acts as a waveguide in order to transmit the light from the LEDs along the length of the candle 602 in direction of arrow 651. The LEDs may be of any color and in turn will cause each corresponding rod 622 to be illuminated with such color. In an embodiment the rods are located along the outer diameter of the candle 602 and spaced side-by-side with corresponding LEDs similarly oriented so that vertical stripes of colors illuminate from the candle. Again, the color of light and frequency at which the light rays are transmitted can be controlled by the computer in order to greatly vary the illumination pattern.

FIG. 6 is a further embodiment disclosing the internal construction of a candle 702 according to the present invention. A candle tube 726 is provided having a vertical rod 710 mounted along an center axis of the candle 702. The rod 710 may have electrical wires therein or may have conductive traces thereon in order to power LEDs 750 mounted along the rod 710. The LEDs 750 may be any color such as red, green or blue. Mounted within the candle 702 oriented at the same location along the rod 710 as the LED 750 are cylindrical disks 722. The disks 722 in an embodiment are formed of clear or colored or translucent or transparent acrylic. The disks 722 have apertures 730 at the center having a diameter slightly larger than the width of the rod 710 and protruding LEDs 750, which can be mounted on both sides or around the entire perimeter of the rod 710. Both the internal and external edges of the disk 722 may be polished in order to aid in the transmission of light from the LEDs 750 for example, in direction of arrow 751. In this way the disks 722 act as waveguides in order to provide an illumination pattern of vertical rings along the length of the candle 702. The disks 722 may be spaced along the rod 710 or each disk 722 may be arranged side-by-side with correspondingly located LEDs along the rod 710. As discussed above, the color of light and frequency at which the light rays are transmitted can be controlled by the computer in order to greatly vary the illumination pattern.

Figure 7:
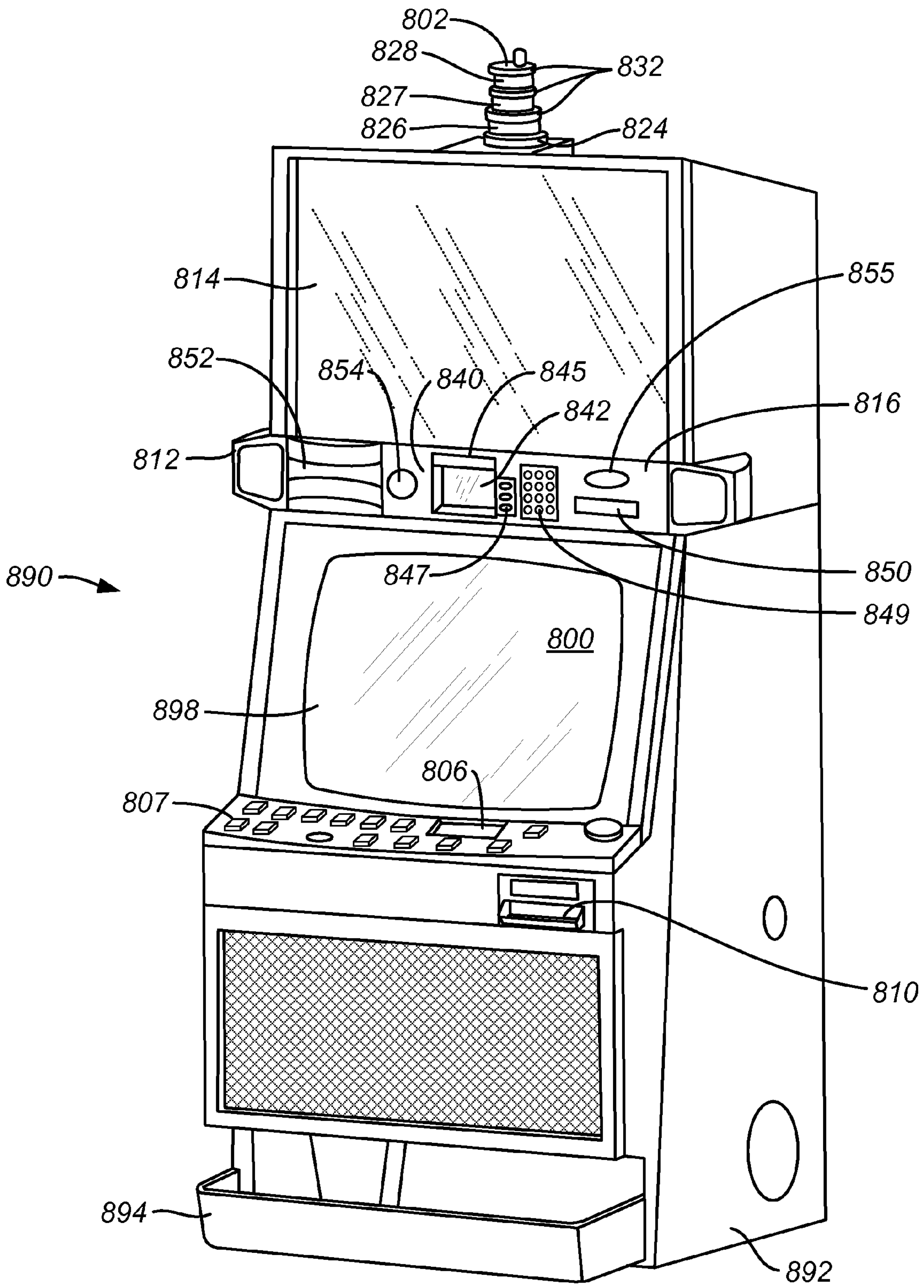
FIG. 7 is a perspective view of a gaming machine depicting another embodiment of the invention.
Figure 8:
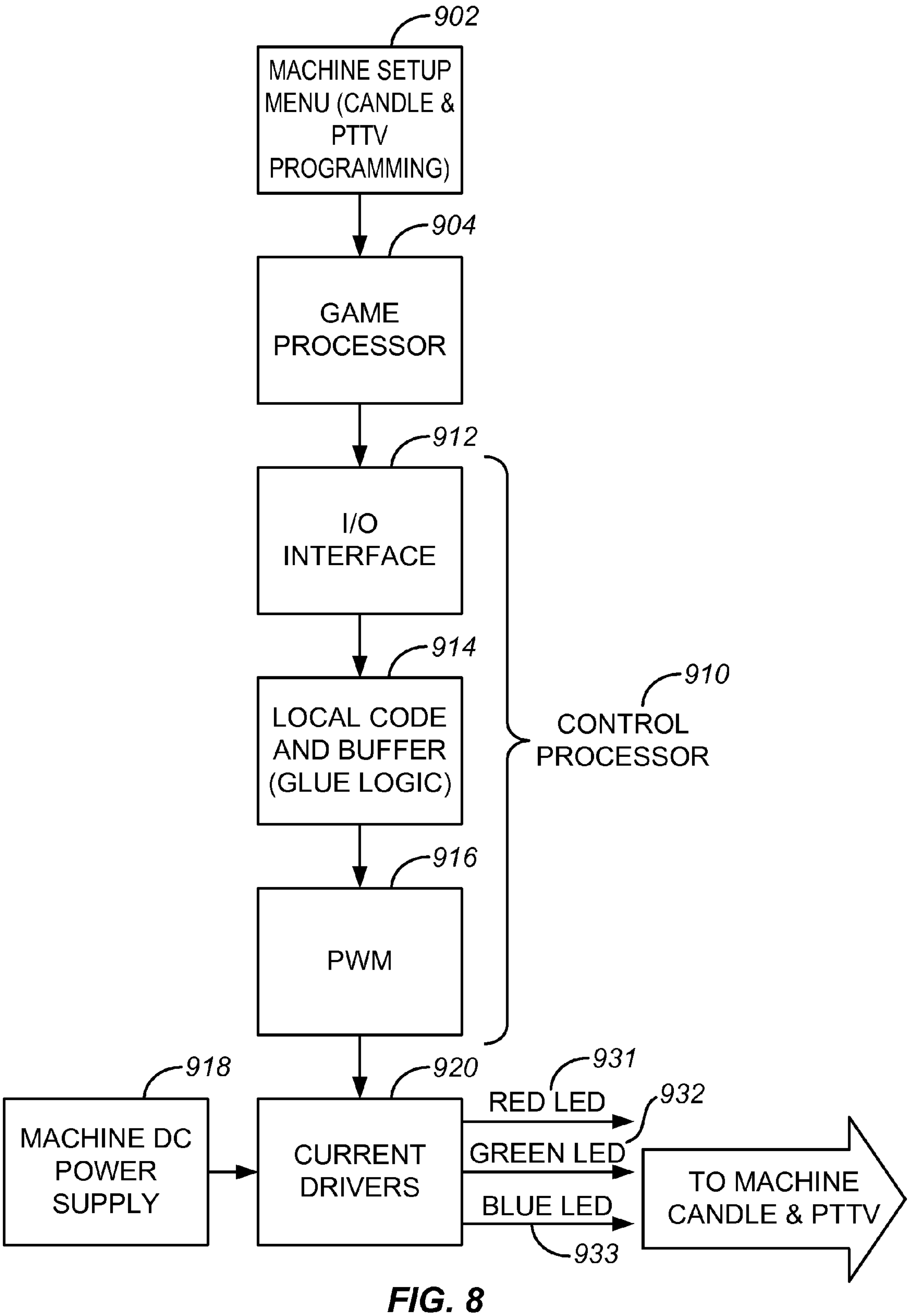
FIG. 8 is a flow diagram of the operation of the invention depicted in FIG. 7.

FIGS. 7 and 8 disclose a further embodiment of the present invention which includes a gaming machine 890 similar to the previously discussed gaming machine 90. This gaming machine 890 includes an external visual indicator such as candle 802. This candle 802 is similar in many respects to the candle 102 described previously. The candle 802 includes a base 824 adapted to be mounted on the gaming machine chassis 892. The base 824 is adapted to receive a cylindrical sleeve 826, which forms a first stage 826. A second stage 827 and third stage 828 are also provided being divided by caps 832. A light source is located inside of each stage 826, 827, 828. In an embodiment, LEDs may be used to provide illumination therein. However, other light sources that emit colored light may be used as well. In an embodiment, the LEDs may be oriented at each stage where at least one LED of each desired color is located at each stage as discussed above. Also, single LEDs that emit multiple colors may be used. Alternate embodiments may be provided where the candle 802 has a single stage or as many as 50 stages. In an embodiment, the multi-stage candle 802 may provide a rainbow display via the illumination of each stage in a different color.

The gaming machine 890 is similar in its other respects to the gaming machine described in FIG. 1 above, except that it includes an alternate player tracking panel 816. In an embodiment, the player tracking panel 816 may be a player tracking television (PTTV™) panel. A PTTV™ panel is described by U.S. patent Ser. No. 09/921,489 filed Aug. 3, 2001 and Ser. No. 10/246,373 filed Sep. 16, 2002, each of which are incorporated herein by reference. The improved player tracking panel 816 includes a visual display panel 840, including a video image display panel 842 and an illuminated bezel 845. The bezel 845 is mounted on a front face of the gaming machine 890. In an embodiment, the bezel 845 may be colored plastic or glass with LEDs mounted behind it, within the display panel 842. In an embodiment, the video image display panel 842 may be a television screen providing video images. For example, the television screen may be a cathode ray tube or a flat panel LCD or plasma display. Also part of the visual display panel 840 may include buttons or a touch pad 847 or in an alternate embodiment a keypad. For example, images appearing on the video image display panel 842 may have selection options which correspond to buttons on the touch pad 847. In an alternate embodiment, the display panel 842 may be a touch screen. The player tracking panel 816 may also include a numeric keypad or a touch pad 849 and a card insertion slot 850. The gaming machine 890 may also include a ticket insertion slot 852 and a pair of speakers 812 located in an embodiment at each end of the player tracking panel 816. A speaker 854 and a proximity sensor 855 are also provided on the player tracking panel 816.

Other elements of the gaming machine 890 are similar to those discussed above. The gaming machine 890 includes a coin or token slot 806 and buttons 807 for activating the gaming machine 890. A display 800 provides for the display of the game. For example, a video image display of spinning wheels for a “lemon/cherry” slot game may be displayed there. The display 800 may also indicate the amount won by the player. Simultaneously, a tray 894 is provided for the output of any winnings. An illuminated panel 814 is provided near the top of the gaming machine 890. The illuminated panel may include a graphic illustration for the type of machine and game that is provided by the particular gaming machine 890. The display 800 may also include a user input panel 898 that allows for the player to indicate choices in the game being played. A dollar bill acceptor 810 is provided to receive paper currency.

Turning to FIG. 8, a flow diagram indicating the operation of the gaming machine depicted in FIG. 7 is depicted. A machine setup menu 902 is provided, which allows for the programming of the candle and player tracking or PTTV™ panel. Programming may be accomplished remotely through a central computer connected to each gaming machine 890 and may be automatically triggered by other events, such as special promotions, etc. The setup menu 902 is accessible through the touch pad screen or user input panel 898 on the monitor 800 of the gaming machine 890. For example, access to the candle setup menu, player tracking panel 816 or PTTV™ panel is to be accessed only by personnel of the gaming facility, or casino and a security code may be required to input through the touch screen 898 in order to access such a setup mode. Existing player or user, interface switches or buttons 807 on the front panel of the game may be assigned temporary special functions during a special "setup mode" where illumination patterns may be selected or programmed by the user. In the case of video games, these controls may be in the form of buttons on a touch screen 898 provided by the display 800. A window or setup menu may appear on the panel or through the touch screen 898 or the video image display panel 842 that will display certain options available in order to set up and program the visual display panel 840 or a candle 802. Headings may be provided on the panel display 898 or video image display panel 842 such as, Colors, Illumination Intensity, Orientation, Strobing Effects, Coordination with Special Events, etc. Upon touching one of the headings on the panel 898, 842, a scroll down menu may appear giving further choices in order to program the candle 802 or visual display panel 840 at the PTTV™ 816. The touch screen and graphics displayed on the panel 898, 842 are controlled by the software which is controlled by the game processor 904.

The game processor 904 is connected to a control processor 910. The control processor in an embodiment comprises an I/O (input/output) interface 912 connected to local coding and buffer (glue logic) 914 which is connected to a modulator, such as a pulse width modulator (PWM) 916. In an embodiment, instead of the use of the PWM, a digital-to-analog converter may be used. These three elements comprise the control processor 910, which is electrically connected to a current driver 920. The current driver is connected to a DC power supply 918. In an embodiment, a 25-volt power supply may be provided. This, in a preferred embodiment, is included in the power supply 918 that provides power for the entire gaming machine.

However, in an alternate embodiment, a separate power supply may be provided solely for the current driver 920 for the candle 802 or PTTV™ panel 816. Running from the current driver are electrical wires that connect to the external visual indicator elements of the candle 802 or the PTTV™ panel 816. In a preferred embodiment, these external visual indicators will be LEDs in the case of the candle 802 and the illuminated bezel 845 of the PTTV™ panel 816. The illuminated bezel 845 may include LEDs or incandescent bulbs or other illumination means. The bezel 845 may be colored polymer such as a plastic covering in front of the LEDs or incandescent bulb. For example, the current driver 920 may be connected via three LED wires 931, 932, 933 which are mounted within the visual display panel adjacent the illuminated player tracking panel 816 including the bezel 845. These wires 931, 932, 933 will also be connected to LEDs mounted in the candle 802 so that upon transmission by the current driver 920, LEDs at the player tracking panel 816 including the bezel 845 and candle 802 will simultaneously illuminate.

Alternate embodiments may allow for wiring of the visual display panel 840 and the candle 802 so that independent illumination may occur based on the occurrence of a special event in the gaming machine 890. The programming of the candle and illuminated bezel 845 would occur in a similar fashion as discussed above for the candle 102 of the embodiment depicted by FIG. 1. As discussed above, multiple LEDs may be used in both the candle 802 and the visual display panel 840. For example, the candle 802 includes three stages 826, 827, 828. In other embodiments the candle 802 may have more than three stages. Each stage may have a grouping of LEDs provided therein in order to provide different illumination patterns and a different color at each stage 826, 827, 828. Correspondingly, the bezel 845 may include multiple LEDs which correspond to the colors at the different stages 826, 827, 828 of the candle 802.

For example, the bezel 845 may be segmented into three sections which correspond to the three stages 826, 827, 828 of the candle 802. In an alternate embodiment, there may be provided, three bezels located one above the next similar to the stages of the candle 802. Each separate section of the bezel 845 would be illuminated in a corresponding fashion to the colors at each stage 826, 827, or 828 provided in the candle 802. For example, the first stage 826 may be connected to the red LED 931 which includes a corresponding red LED located in a first section of the bezel 845. Second stage 827 of the candle may include a green LED 932 which also connects to a green LED 932 located in a second section of the bezel 845. Finally, the third stage 828 may be connected to a blue LED 933 which is also connected to a blue LED 933 at a third section of the bezel 845. Therefore, it may be understood that upon activation of the current drivers 920, illumination of the red LED connection 931 will simultaneously illuminate the first stage 826 of the candle 802 and the first section of the bezel 845 providing for red illumination in both places. Simultaneously (or as a separate event) transmission by the current driver through the green LED line 932 will cause the green LED in the second stage 827 of the candle 802 and the second section of the bezel 845 to provide a green illumination. The transmission by the current driver via the blue LED transmission line 933 will cause the third stage 826 of the candle 802 and the third section of the bezel 845 to provide for blue illumination simultaneously.

It is to be understood, of course, that other colors may be provided at both the candle 802 and the bezel 845. Also, alternate combinations of colors may be provided and in some instances, it may be desirable that the candle 802 and bezel 845 are not illuminated simultaneously. It may be in certain circumstances that a strobe effect would occur alternating between the candle 802 and the bezel 845, for example. It is to be understood that the candle 802 may also include configurations such as that discussed above for FIGS. 4-6 of this invention. Similar light transmission means may also be used for the bezel 845.

Therefore, it may be understood that upon the occurrence of certain special events such as a bonus round, a door of the gaming machine being open, the requirement for change or coins, a request for a drink, an indication that the player is a member of a player's club, etc. will cause illumination of the candle 802 and/or the visual display panel 840 either simultaneously or in some combination to indicate such an event. For example, if a gaming machine is in the need for more change, the candle 802 and bezel 845 may have a green illumination. An attendant who is servicing many gaming machines in a casino who must provide change for the machines will have both the candle 802 and the bezel 845 illuminated to signal to the attendant that change is needed. In the situation where a player may be standing in front of the gaming machine blocking the attendant's view of the bezel 845, the alternate illumination by the candle 802 provides for a backup signaling means so that the attendant will not walk past the machine and fail to provide change. The coordination of the visual display panel 840 of the PTTV™ panel 816 for example, and the candle 802 allows for better visibility and response time by casino personnel and attendants. As well, when a player has entered certain information via the video image display panel 842, such as that a drink is needed or show tickets or a request to join the player club, the bezel 845 and candle 802 may be illuminated to signal each of these individual requests.

Therefore, it may be understood that the reprogrammable candle and bezel of the present invention provides for illumination effects that may have many multiple arrangements which were not available on previous gaming machines. The availability of so many multiple effects of the candles and bezel provides for many opportunities to use the gaming machine visual displays in many new ways. As opposed to merely signaling a servicing problem or merely a single bonus round; the programmable candle may be used for many other circumstances and marketing purposes. The candle may communicate much information about the events occurring at that single gaming machine or a group of gaming machines. It is known that gaming machines may be connected through a local area network. The present invention may provide for the programming of the candle or display panel from a remote location via a local area network. In such a circumstance an entire group of gaming machines may be programmed in order to coordinate the flashing or illumination of their candles or bezels in order to display the certain information. For example, in a casino a group of ten gaming machines out of one hundred at certain times of the day have better odds than other machines or provide more bonus rounds. As well, the external visual indicator of the present invention may allow for the generation of more excitement at each gaming machine by flashing the candle or bezel or providing strobing effects, etc., which may indicate that a player has reached higher and higher levels within the machine and that higher and higher amounts of money are able to be won at that machine. Such strobing may cause other patrons of the casino to gather around that particular gaming machine. In addition, certain flashing lights may indicate that a member of a casino select group of patrons has begun to play that specific gaming machine. Therefore, it may be understood that the present invention may be used to promote the business and use of the gaming machine in addition to its more beneficial use to indicate what type of servicing might be required on each machine.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A gaming machine comprising:

a user input panel;

a processor coupled to the input panel and adapted to be programmed in response to an input operation by a user;

a candle mounted to the gaming machine configured to emit a plurality of different colors of light according to instructions from the processor;

a player tracking panel having an illuminated bezel, the bezel configured to emit a plurality of different colors of light according to instructions from the processor, wherein the processor is configured to cause the candle and the bezel to simultaneously emit the same plurality of different colors of light.

2. The gaming machine of claim 1 wherein:

the candle comprises a cylindrically shaped electronic candle mounted on a top surface of the gaming machine and the player tracking panel includes a display panel having a bezel located on a front face of the gaming machine.

3. The gaming machine of claim 1 wherein the candle includes multiple light emitting diodes (LEDs) connected to the processor.

4. The gaming machine of claim 3 wherein the processor is a gaming machine processor.

5. The gaming machine of claim 3 wherein the processor is a player tracking television panel processor.

6. The gaming machine of claim 3 wherein the processor is a processor of the gaming machine and the player tracking television panel.

7. The gaming machine of claim 1 wherein the input panel provides a method of programming the colors of light emitted by the candle and the bezel using existing input switches or devices on the front of the game machine.

8. The gaming machine of claim 1 further comprising a pulse width modulator connected to the processor and a current driver connected to the pulse width modulator and connected to said candle having multiple light emitting diodes.

9. The gaming machine of claim 8, wherein the candle and the bezel includes at least two stages and each stage having at least one of the multiple light emitting diodes mounted therein.

10. The gaming machine of claim 9 wherein the processor provides for the ability to provide a strobing effect of the light emitting diodes.

11. The gaming machine of claim 9 wherein the light emitting diodes provide for the colors red, green and blue.

12. The gaming machine of claim 11 wherein the processor provides for the ability to produce colors other than the primary colors by mixing the colors of the light emitting diodes.

13. The gaming machine of claim 11 wherein at least one of the light emitting diodes is a multiple color light emitting diode.

14. The gaming machine of claim 8 further comprising an input/output interface connected to the processor.

15. The gaming machine of claim 14 further comprising a coding and buffer system connected to the input/output interface.

16. The gaming machine of claim 15 further comprising a direct current power supply connected to the current driver.

17. The gaming machine of claim 16 wherein a user may access the user input panel to choose a combination of lights and colors to be displayed so that an electrical signal is sent to the processor which signals the input/output interface which signals the coding and buffer system which signals the pulse width modulator in order to control the current driver in order to control the light emitting diodes according to the combination chosen by the user.

18. The gaming machine of claim 17 wherein the processor includes all other components and functions in order to operate the gaming machine and provides for a main processor.

19. The gaming machine of claim 18 wherein the pulse width modulator is connected to the main processor via a secondary stand-alone board.

20. The gaming machine of claim 18 wherein the processor is a secondary processor which is separate from the main processor that operates the primary functions of the gaming machine.

21. The gaming machine of claim 1 wherein the player tracking panel includes a player tracking television panel having an illuminated bezel.

22. A method of promoting the use of gaming machines via the use of computer programmed external visual indicators, the method comprising the steps of:

providing a gaming machine having a programmable external visual indicator and a player tracking panel having a display panel each connected to a processor of the gaming machine;

coordinating the external visual indicator and the display panel with a first special event of the gaming machine, the external visual indicator including at least one light source mounted in the visual indicator and adapted to emit a plurality of colors of light;

programming the processor so that a first customized illumination pattern, including at least one of the colors of light, is provided by the external visual indicator and the display panel in order to designate the first special event; and automatically triggering the first customized illumination pattern of the external visual indicator and the display panel simultaneously upon the occurrence of the first special event.

23. The method of claim 22 wherein the external visual indicator is an electronic candle and the display panel is a bezel.

24. The method of claim 22 wherein the first special event is a bonus round.

25. The method of claim 22 wherein the first special event is a jackpot.

26. The method of claim 22 wherein the first special event is the requirement to service the gaming machine.

27. The method of claim 22 wherein the first customized illumination pattern includes a strobing effect.

28. The method of claim 22 wherein the first customized illumination pattern includes a combination of lights to provide a yellow illumination.

29. The method of claim 22 wherein the first customized illumination pattern includes a combination of the colors of light to provide a purple illumination.

30. The method of claim 22 wherein the first customized illumination pattern includes a combination of the colors of light to provide a green illumination.

31. The method of claim 22 wherein the first customized illumination pattern includes a combination of the colors of light to provide an orange illumination.

32. The method of claim 22 wherein the first customized illumination pattern includes a combination of the colors of light to provide an indigo illumination.

33. The method of claim 22 wherein the first customized illumination pattern provides any selected color of light by combining red, green and blue colored light emitting diodes.

34. The method of claim 22 wherein the first customized illumination pattern includes a combination of the colors of light to provide a violet illumination.

35. The method of claim 22 wherein the first customized illumination pattern includes a combination of the colors of light to provide a first stage of a candle having a first color of light and a second stage of the candle having a second color of light and a first stage of a bezel having a first color of light and a second stage of the bezel having a second color of light.

36. The method of claim 22 wherein the first customized illumination pattern includes a combination of the colors of light to provide a first stage of a candle or a bezel having a first color of light, a second stage of the candle or the bezel having a second color of light and a third stage of the candle having a third color of light.

37. The method of claim 22 wherein the first customized illumination pattern includes a combination of the colors of light to provide a first stage of a candle or a bezel having a first color of light, a second stage of the candle or the bezel having a second color of light, a third stage of the candle or the bezel having a third color of light and a fourth stage of the candle or the bezel having a fourth color of light.

38. The method of claim 22 further comprising the steps of programming the processor so that a second customized illumination pattern including at least one of the colors of light is provided.

39. The method of claim 38 further comprising the steps of programming the processor so that a second special event triggers the second customized illumination pattern.

40. The method of claim 22 wherein light source of the programmable external visual indicator comprises multiple light emitting diodes mounted within a cylindrically shaped electronic candle and within a bezel mounted on a front face of the gaming machine.

41. The method of claim 22 wherein the programmable external visual indicator comprises a cylindrically shaped electronic candle and a bezel, each having at least two stages and each stage having a light source including multiple light emitting diodes mounted therein consisting of arrays of a red, green or blue light emitting diode.

42. The method of claim 22 wherein the step of programming the processor further includes the steps of providing a user input panel, choosing a combination of the colors of light to be displayed, sending an electrical signal to the processor, signaling an input/output interface, signaling a coding and buffer system, signaling a pulse width modulator in order to control a current driver in order to control the light emitting diodes according to the combination chosen by the user.

43. The method of claim 22 wherein the step of automatically triggering the first customized illumination pattern occurs via sending an electrical signal to the processor, signaling an input/output interface, signaling a coding and buffer system, signaling a pulse width modulator in order to control a current driver in order to control the light emitting diodes according to the combination chosen by the user.

44. The method of claim 22 wherein the display panel is a colored bezel.

45. An improved electronic candle mounted on a gaming machine is provided comprising:

a gaming machine having a signal processor coupled to a modulator, a current driver coupled to the modulator and the candle, the candle including a light source adapted to emit a plurality of colors of light;

a player tracking panel having a display panel coupled to the modulator, the display panel configured to illuminate a plurality of colors of light; and a user input panel provided by the gaming machine connected to the processor by which a first illumination pattern, including at least one of the plurality of colors of light, may be selected, wherein the user may indicate a first special event to trigger the first illumination pattern to simultaneously appear on the display panel and the candle.

46. The gaming machine of claim 45 wherein the user input panel provides for the selection of a second illumination pattern including at least one of the colors of light and a second special event.

47. The gaming machine of claim 45 wherein the candle and the display panel each include three stages having multiple light emitting diodes per stage.

48. The gaming machine of claim 45 wherein the candle and the display panel is controlled via a network or computer system that controls the candle and the display panel in a bonusing or a progressive jackpot situations.

49. The gaming machine of claim 45 wherein the candle includes a conical parabolic reflector mounted to a printed circuit board having light emitting diodes mounted thereon that reflect light off of said reflector and out of the candle.

50. The gaming machine of claim 45 wherein the candle includes multiple translucent rods mounted within the candle corresponding to light emitting diodes mounted therein in order to illuminate the rods.

51. The gaming machine of claim 45 wherein the candle includes translucent disks mounted within the candle adjacent to corresponding light emitting diodes in order to illuminate the disks.

52. The gaming machine of claim 45 wherein the display panel is a colored bezel mounted to a player tracking television panel.

* * * * *

UNITED STATES PATENT AND TRADEMARK OFFICE

CERTIFICATE OF CORRECTION

PATENT NO. : 7,442,125 B2
APPLICATION NO. : 10/435298
DATED : October 28, 2008
INVENTOR(S) : Paulsen et al.

It is certified that error appears in the above-identified patent and that said Letters Patent is hereby corrected as shown below:

Title Page & Col. 1

In the section (54) Title of Invention:
change “PROGRAMMABLE COMPUTER CONTROLLED EXTERNAL VISUAL CANDLE AND BEZEL INDICATORS FOR A GAMING MACHINE” to
-- PROGRAMMABLE COMPUTER CONTROLLED EXTERNAL VISUAL INDICATOR FOR GAMING MACHINE --.

Signed and Sealed this

Twenty-fourth Day of February, 2009

JOHN DOLL
*Acting Director of the United States Patent and Trademark Office*